United States Patent [19]

College et al.

[11] Patent Number: 5,375,341

[45] Date of Patent: Dec. 27, 1994

[54] CRIMP HEIGHT MEASUREMENT DEVICE

[75] Inventors: David A. College; David J. Erb, both of Harrisburg, Pa.

[73] Assignee: The Whitaker Corporation, Wilmington, Del.

[21] Appl. No.: 261,698

[22] Filed: Jun. 17, 1994

Related U.S. Application Data

[63] Continuation of Ser. No. 21,836, Feb. 24, 1993, abandoned.

[51] Int. Cl.$^5$ ................................ G01B 5/00
[52] U.S. Cl. ........................ 33/804; 33/805; 33/783; 33/545; 33/555
[58] Field of Search ............... 33/803, 804, 805, 821, 33/828, 783, 792, 501.05, 545, 549, 555, 557, 560; 29/705

[56] References Cited

U.S. PATENT DOCUMENTS

| | | | |
|---|---|---|---|
| 1,292,340 | 1/1919 | Lutiger | 33/557 X |
| 1,436,354 | 11/1922 | Parker | 33/803 |
| 1,779,477 | 10/1930 | Langston | 33/557 |
| 2,849,797 | 9/1958 | Etchell | 33/804 X |
| 3,550,239 | 12/1970 | Rider . | |
| 4,856,186 | 8/1989 | Yeomans | 29/705 X |
| 5,168,736 | 12/1992 | Ennaper et al. | 29/705 X |

Primary Examiner—Alvin Wirthlin
Attorney, Agent, or Firm—Robert J. Kapalka

[57] ABSTRACT

An apparatus for measuring crimp height between crimped opposite sides of a terminal which has been crimped to an element is provided. The apparatus is particularly useful for measuring the crimp height of a terminal when one or more of the crimped opposite sides has a surface profile that is non-planar, or when a soft insulation sleeve is present on the terminal in the crimp area. The apparatus includes a pair of opposed probe members which are relatively movable between open and closed positions. In the open position the probe members are spaced apart. In the closed position the probe members are biased against the crimped opposite sides by springs. The probe members are specially configured to match the surface profiles of the crimped opposite sides.

16 Claims, 9 Drawing Sheets

CRIMP HEIGHT MEASUREMENT DEVICE

This application is a Continuation of Application Ser. No. 08/021,836 filed Feb. 24, 1993, now abandoned.

BACKGROUND OF THE INVENTION

1. Field of the Invention

The invention relates to the field of devices for measuring a dimension between crimped opposite sides of a terminal which has been crimped to an element.

2. Prior Art

A metal terminal is commonly attached to an end of an electrical conductor by crimping, i.e., deforming the terminal between opposed crimping dies until the deformed terminal tightly engages the end of the conductor disposed therein. The crimp height, i.e., the height or vertical dimension of the deformed terminal, very often is a good indicator of the quality of the crimp. The terminal must be deformed sufficiently to ensure a reliable electrical and mechanical connection with the conductor, but excessive deformation will overstretch the terminal and/or conductor, thereby weakening the connection or reducing electrical performance. Terminals and conductors are available in many different styles and sizes, and pullout tests and electrical performance tests are often performed on different combinations of the terminals and conductors to determine the crimp height which provides the best combination of resistance to separation of the terminal and conductor, and electrical performance. A target crimp height, plus or minus some tolerance, is then established as an acceptable crimp height for the particular combination of terminal and conductor.

The crimp height is measured with a micrometer or other measuring device having opposed cones or bars which are movable to engage the crimped terminal therebetween. However, some crimped terminals have unusual configurations, and the crimp height of such terminals is not accurately measurable by the common measuring instruments having opposed cones or bars. Other crimped terminals have a plastic insulation on the crimped portion of the terminal. The insulation deforms under point or edge loading applied by the opposing surfaces of the measuring instrument, thereby hindering accurate measurement of the crimp height.

Another problem encountered when measuring the crimp height of terminals with the plastic insulation sleeve is that the insulation often pulls up off of a concave surface of the terminal and forms a gap between the crimped terminal and the insulation. Again, accurate measurement of the crimp height is difficult or impossible.

Currently, crimp heights are not directly measured on terminals such as those discussed above. There is a need for an apparatus which enables non-destructive measurement of the crimp height of such terminals. The present invention provides an apparatus and method for non-destructive, direct measurement of the crimp height of terminals having unusual configurations or having insulation thereon.

SUMMARY OF THE INVENTION

It is an object of the invention to provide an apparatus for measuring crimp height between crimped opposite sides of a terminal which has been crimped to an element. The invention is particularly useful for measuring the crimp height of a terminal when one or both of the crimped opposite sides has a surface profile that is non-planar. The apparatus includes a pair of opposed probe members which are relatively movable between a remote position wherein the probe members are spaced apart, and a proximate position wherein the probe members are engageable against the crimped opposite sides. The probe members are specially configured to match the surface profiles of the crimped opposite sides. The apparatus further includes means for moving the probe members between the remote and proximate positions, means for biasing the probe members against the opposite sides of the engaged terminal, and means for measuring a distance between the probe members when the probe members are engaged against the crimped opposite sides.

In one embodiment, the apparatus includes a frame having a fixed base and a plate member guided for reciprocal movement with respect to the base. One of the probe members is attached to the base, and the other of the probe members is coupled to the plate member for reciprocal movement between the remote and proximate positions. The biasing means includes a spring member connected between the base and the plate member. The means for moving includes a manually operable handle pivotally connected to the base, an end of the handle being engageable against a bottom of the plate member for urging the plate member in opposition to the spring member.

In another embodiment, the apparatus includes memory means for recording a standard separation between the probe members, and means for measuring a difference between the standard separation and a final separation occurring when the probe members are engaged against the opposite sides of the terminal.. The memory means and the means for measuring may include a dial indicator fixed with respect to the base and having a tip in contact with the plate member for displaying a relative position of the plate member.

The invention may also include multiple pairs of the opposed probe members which are configured for measuring the crimp heights of terminals having different sizes and configurations. Each of the reciprocally movable probe members is attached to the plate member by a threaded fastener extending through a slot in the probe member.

The invention also provides a process for measuring crimp height of a terminal having a pair of crimped opposite sides. The process includes the steps of providing a pair of probe members which are configured to match the surface profiles defined by the opposite sides of the crimped terminal; providing a gage terminal of a standard crimp height and having opposite sides defining surface profiles the same as the surface profiles of the crimped terminal; biasing the probe members against the opposite sides of the gage terminal; recording a standard separation between the probe members during the biasing; relieving the biasing and withdrawing the gage terminal; biasing the probe members against the opposite sides of the crimped terminal; and measuring a difference between the standard separation and a final separation occurring during the biasing against the crimped terminal.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENT

Figure 1:
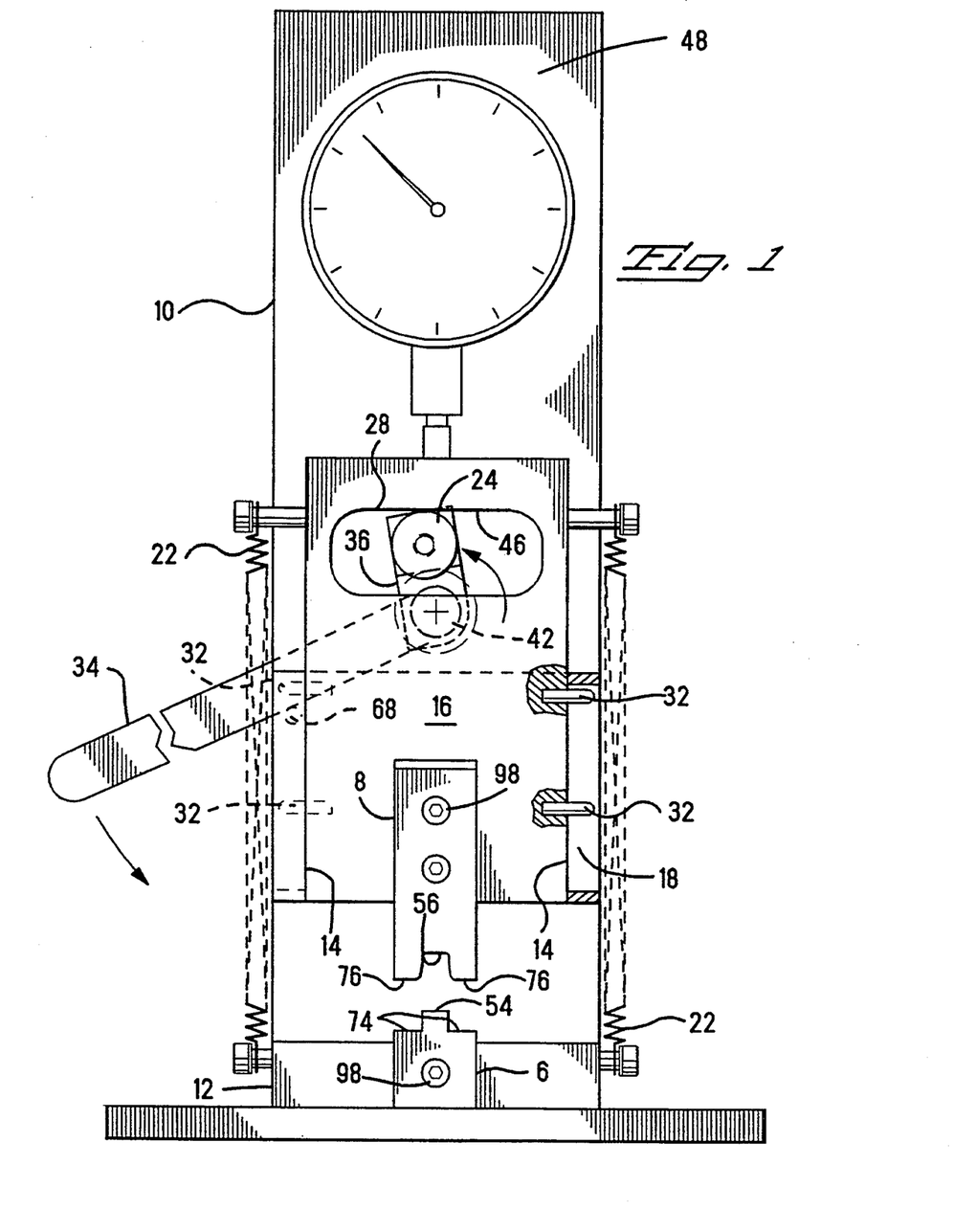
FIG. 1 is a front view of a crimp height measurement device having a pair of opposed probe members in a remote, or open, position according to the invention.
Figure 2:
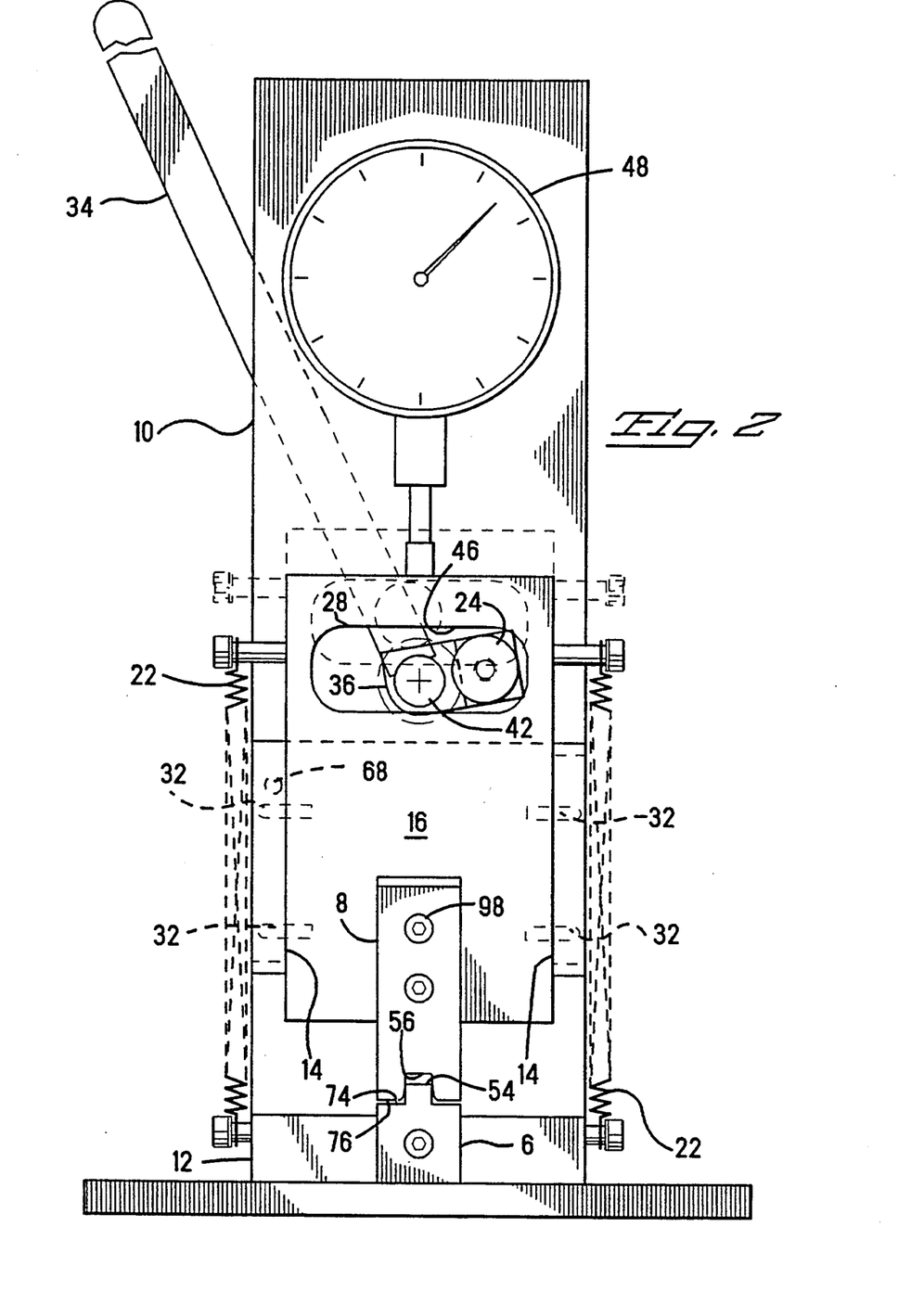
FIG. 2 is a front view of the crimp height measurement device having the probe members in the proximate, or closed, position.
Figure 3:
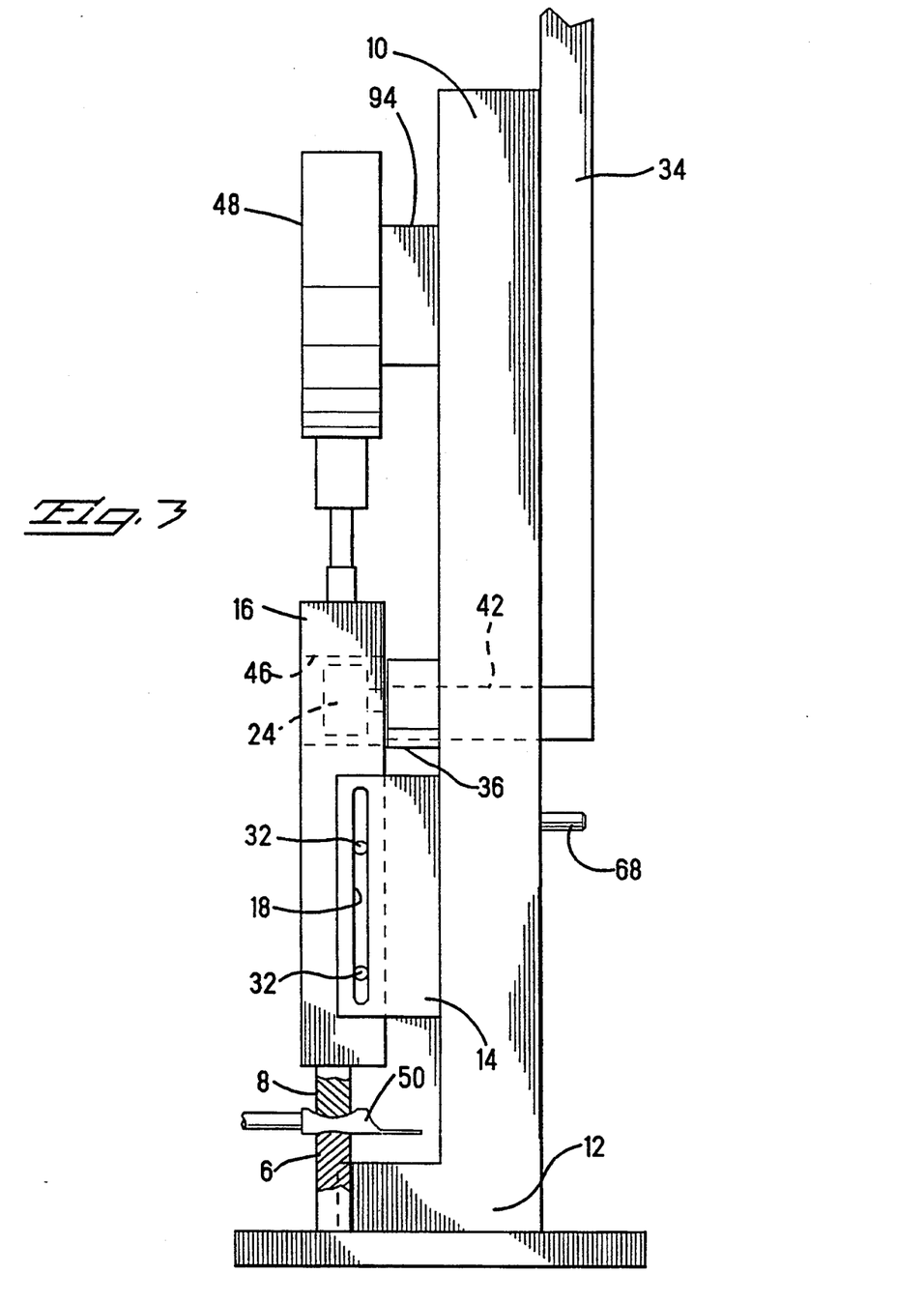
FIG. 3 is a side view of the crimp height measurement device having the probe members in the closed position.

The present invention provides an apparatus for measuring crimp height of a terminal which has been crimped to an element wherein the crimped terminal has a pair of crimped opposite sides each of which defines a surface profile, and at least one of the opposite sides has a non-planar surface profile. As shown in FIGS. 1, 2 and 3, the present invention includes a frame 10 having a fixed base 12 and a guide member 14 having vertical slots or channels 18. A plate member 16 is guided for reciprocal movement with respect to the base 12 by guide pins 32 extending from opposite sides of the plate member 16 and slidably received in the slots or channels 18.

Figure 12:
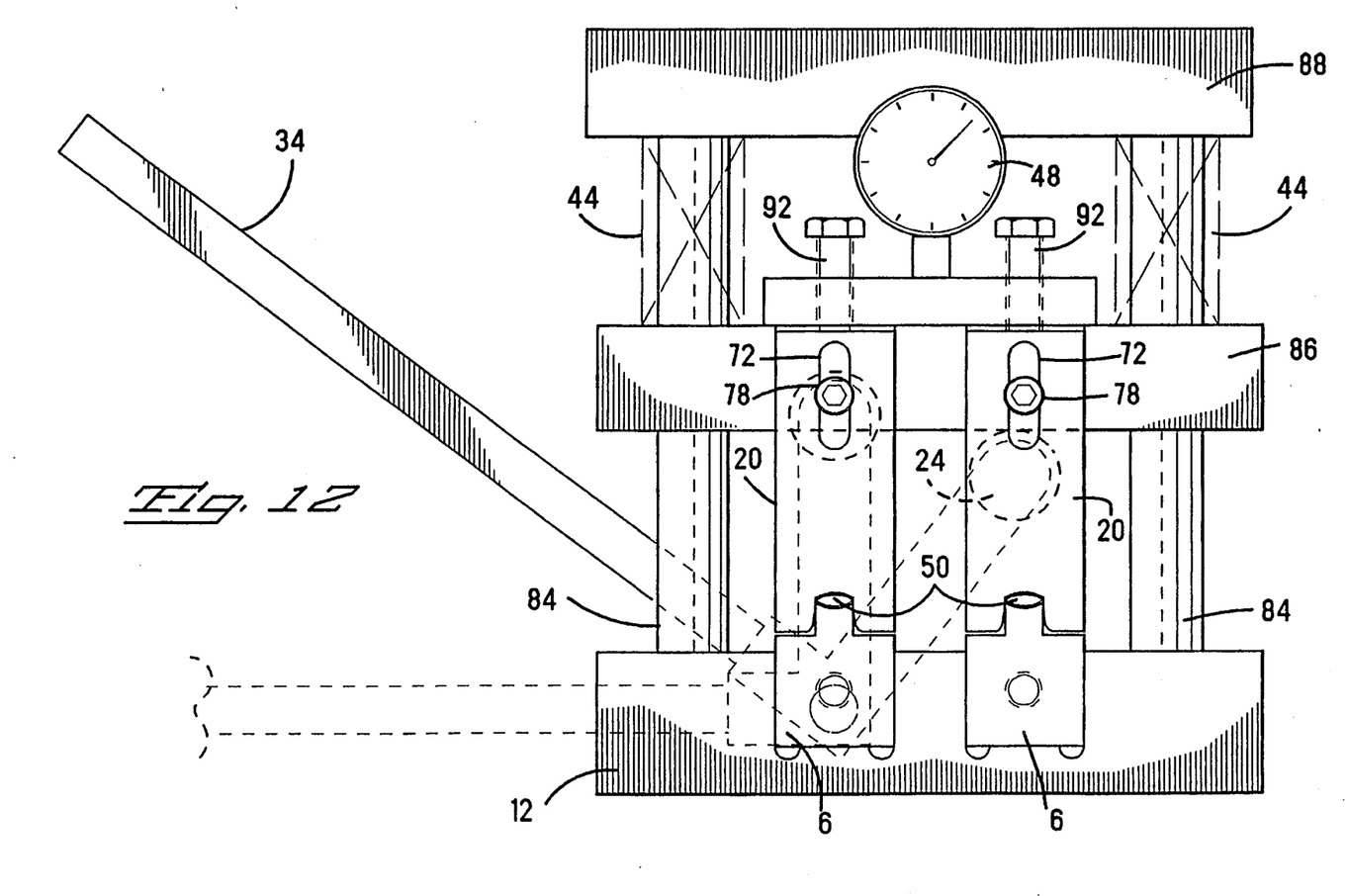
FIG. 12 is a front view of a crimp height measurement device having multiple pairs of opposed probe members in a closed position.

Alternate means for guiding the plate member 16 during reciprocal movement will be readily apparent to those skilled in the art. Such alternate means may include, for example, as shown in FIG. 12, vertical posts 84 extending from the base 12 through holes in plate member 86. All such alternate means are considered to be within the scope of the invention.

Figure 10:
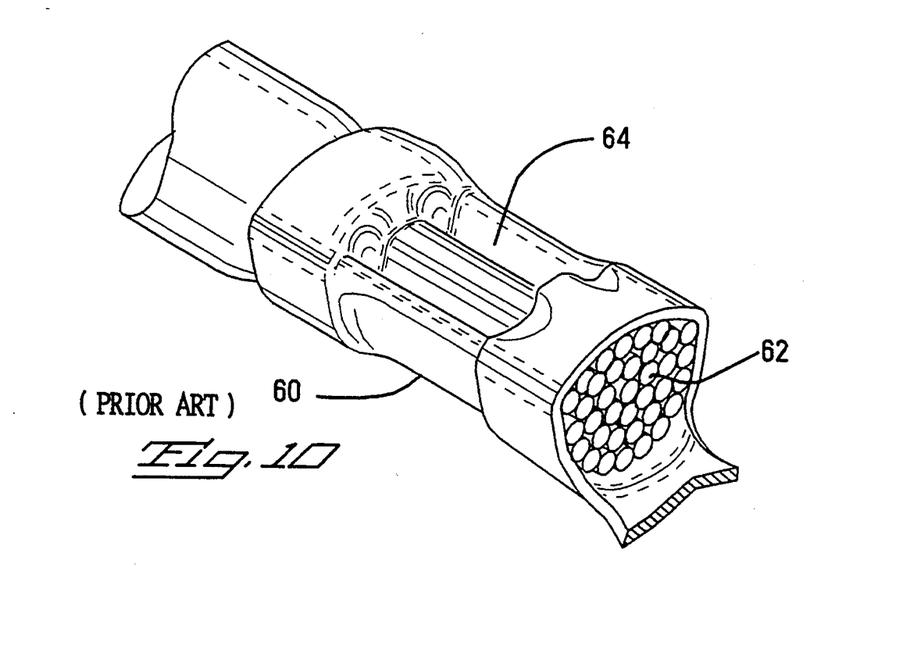
FIG. 10 is an isometric view of a "W" style crimped terminal.
Figure 11:
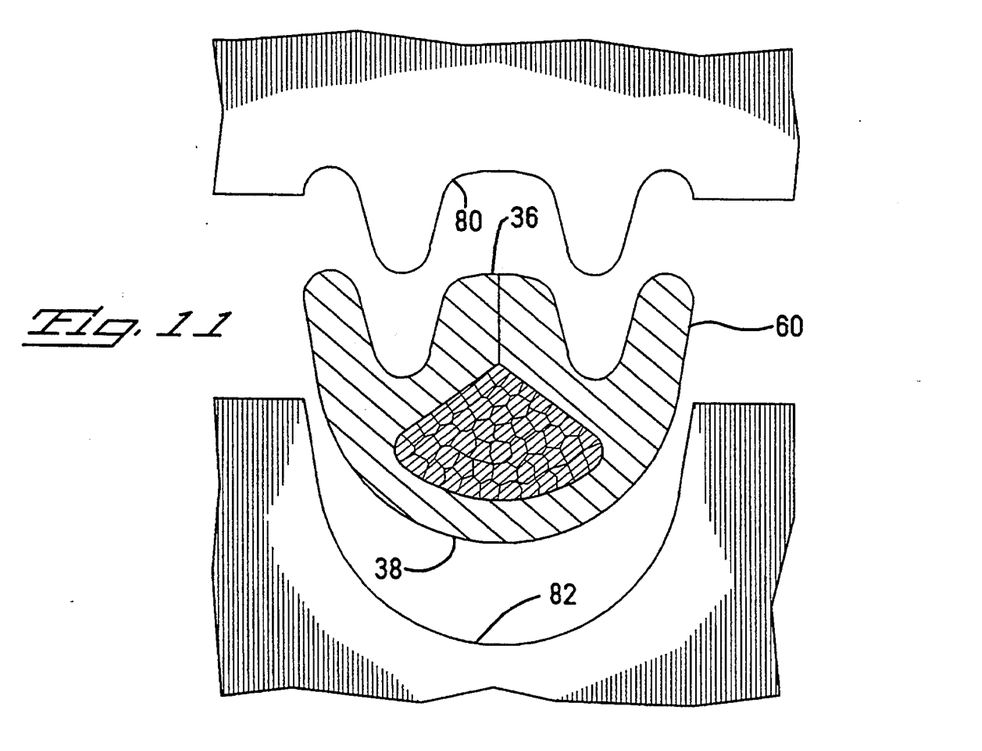
FIG. 11 is a cross-sectional view a "W" style crimped terminal disposed prior to being measured between probe members of the crimp height measurement device according to the invention.

The apparatus shown in FIGS. 1, 2 and 3 includes a pair of opposed probe members 6 and 8. The probe member 6 is coupled to the base 12. The probe member 8 is coupled to the plate member 16 and is relatively movable with the plate member 16 toward and away from the probe member 6. In a remote position, shown in FIG. 1, the apparatus is open and the probe members are spaced apart, while in a proximate position, shown in FIG. 2, the apparatus is closed and the probe members are engageable against the crimped opposite sides of a terminal disposed therebetween. Each of the probe members 6, 8 has a probe surface 54, 56, respectively, that is configured to match the surface profile of one of the crimped opposite sides of the terminal to be engaged. As shown in FIG. 10, for example, a terminal 60 has been crimped to a conductor 62 in a crimping machine using a "W" style crimp 64. In FIG. 11, the crimped terminal 60 is shown in cross-section disposed prior to measurement between a pair of opposed probe members having probe surfaces 80, 82 each of which has a configuration selected to match the surface profile defined by crimped sides 36, 38 respectively. When the probe members having the probe surfaces 80, 82 are engaged against the crimped sides of the terminal 60, the crimp height of the terminal 60 can be measured or calculated by measuring a relative dimension between the probe members.

Referring again to FIGS. 1, 2 and 3, the probe members 6 and 8 are preferably replaceable, by removing threaded fasteners 98, and selectable from among a variety of sizes and shapes of probe members in order to accommodate different sizes and shapes of crimped terminals.

Springs 22 are connected between the base 12 and the plate member 16 for urging the plate member downward and biasing the probe members against the opposite sides of the engaged terminal. The springs 22 exert a substantial force on the plate member 16, and, in a preferred embodiment, approximately 40 pounds of force is transmitted by the probe member 8 to the engaged terminal in order to firmly seat any insulation that has pulled up from the terminal. Other forces may be desirable with other terminals and crimp configuration. Alternatively, an extensible cylinder actuated by pneumatic or hydraulic forces could be utilized in place of the springs 22 for biasing the probe members against the sides of the engaged terminal.

A handle 34 having arm 36 is pivotally attached to the frame 10 by pivot pin 42. The handle 34 is connected for moving the plate member 16 carrying the probe member 8 in opposition to the force of the springs 22. In the preferred embodiment shown in FIGS. 1 and 2, a roller 24 at an end of the arm 36 is disposed in aperture 28 defined in the plate member 16. Upon counterclockwise rotation of the handle 34, the roller 24 is urged upwardly against a top wall 46 of the aperture 28, thereby raising the plate member 16 along with the probe member 8 against the force of gravity and the force exerted by the springs 22. A stop 68 connected to the frame 10 is provided to prevent further counterclockwise rotation of the handle 34 after the arm 36 is approximately ten degrees beyond vertical, thereby providing a means for releasably locking the probe members 6 and 8 in the remote position. The probe members can be released from the remote position by applying a force to the handle 34 in a direction to rotate the handle clockwise. Due to the bias of the springs 22 on the plate member 16, an initial force must be applied to the handle 34 to lift the plate member 16 against the spring force until the arm 36 is moved slightly past vertical, at which time applying slight resistance to handle 34 allows the springs 22 to bring the probe member 8 gradually toward the probe member 6.

Figure 4:
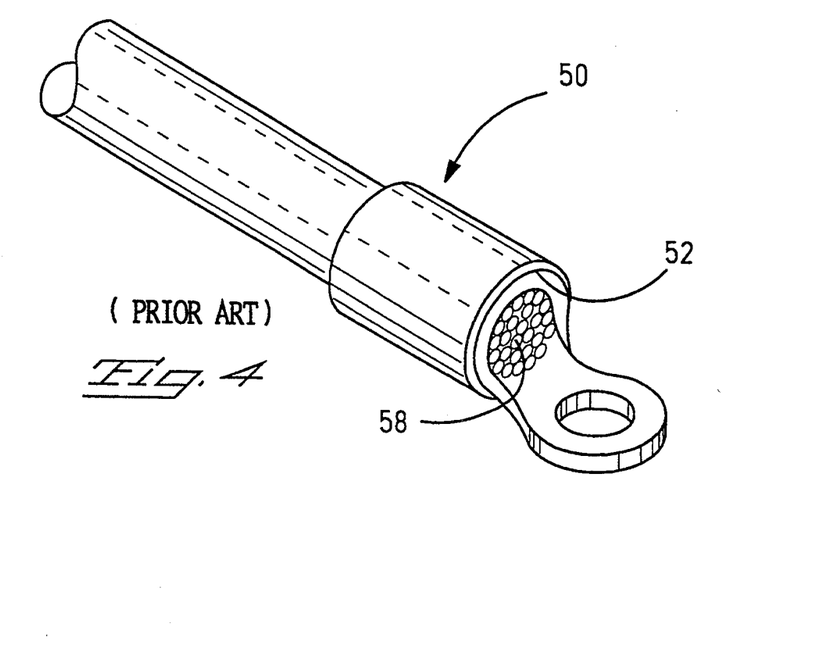
FIG. 4 is an isometric view of an insulated terminal prior to being crimped on a wire.
Figure 5:
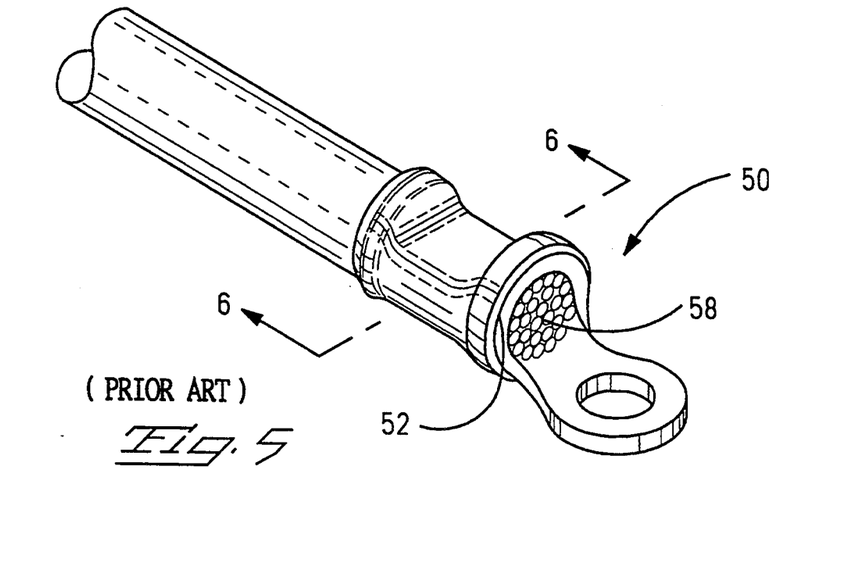
FIG. 5 is an isometric view of an insulated terminal after being crimped on a wire.
Figure 6:
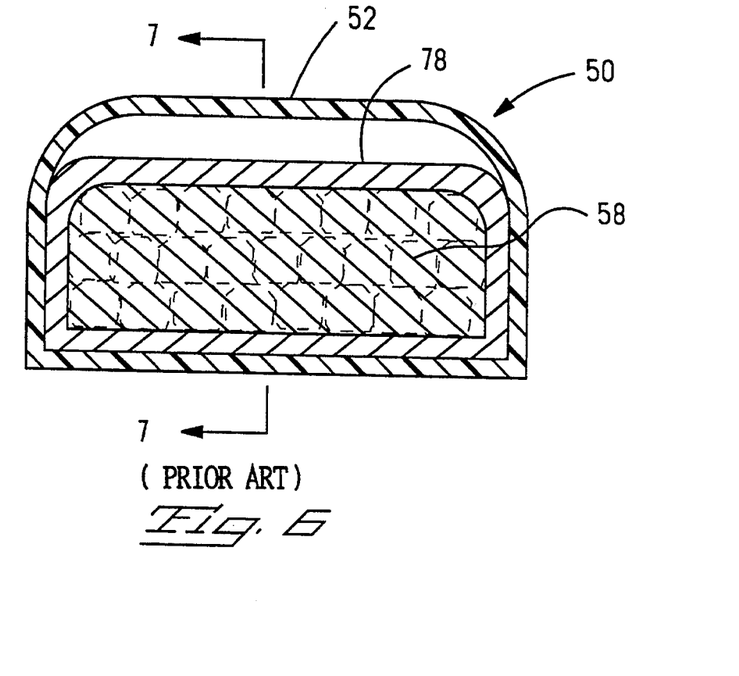
FIG. 6 is an enlarged cross-sectional view taken along line 6—6 of FIG. 5.
Figure 7:
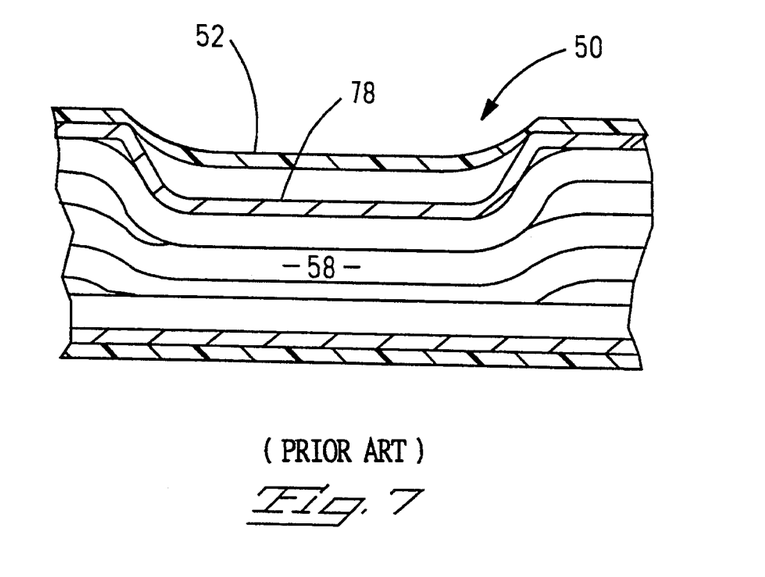
FIG. 7 is a cross-sectional view taken along line 7—7 of FIG. 6.

Stop surfaces 74, 76 are provided on the probe members 6, 8, respectively. When there is no terminal disposed between the probe members and the apparatus is in the closed position, the stop surfaces 74 and 76 are in abutting relationship and there is no contact between the probe surfaces 54 and 56. Abutment of the stop surfaces 74, 76 protects the probe surfaces 54, 56 from damaging contact, especially such contact as would occur from crashing together if the probe member 8 was suddenly released from the open position without resistance on the handle 34. Referring now to FIGS. 4 and 5, a terminal 50 having plastic insulation sleeve 52 is shown before being crimped (FIG. 4) and after being crimped (FIG. 5) to a conductor 58. As shown in cross-section in FIGS. 6 and 7, after being crimped the insulation sleeve 52 typically separates from wall 78 of the terminal 50 due to resilience of the sleeve. The present invention is specially adapted to urge the sleeve 52 against the wall 78 during crimp height measurements so that the true deformed height of the terminal 50 is measured.

Figure 8:
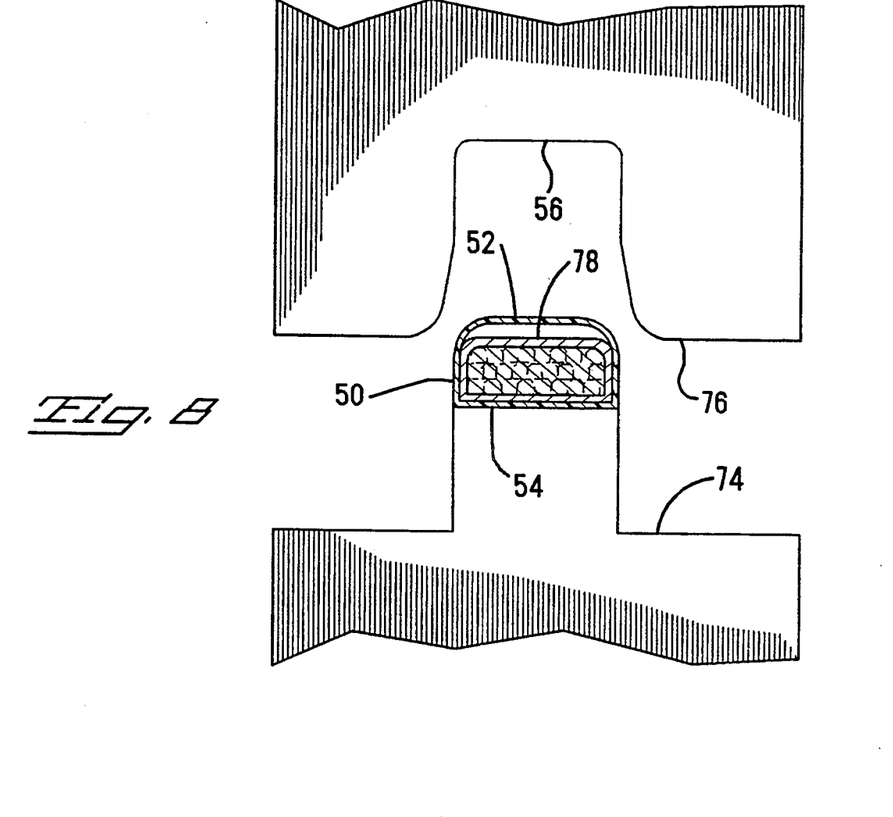
FIG. 8 is a cross-sectional view of an insulated terminal disposed prior to being measured between probe members of the crimp height measurement device according to the invention.
Figure 9:
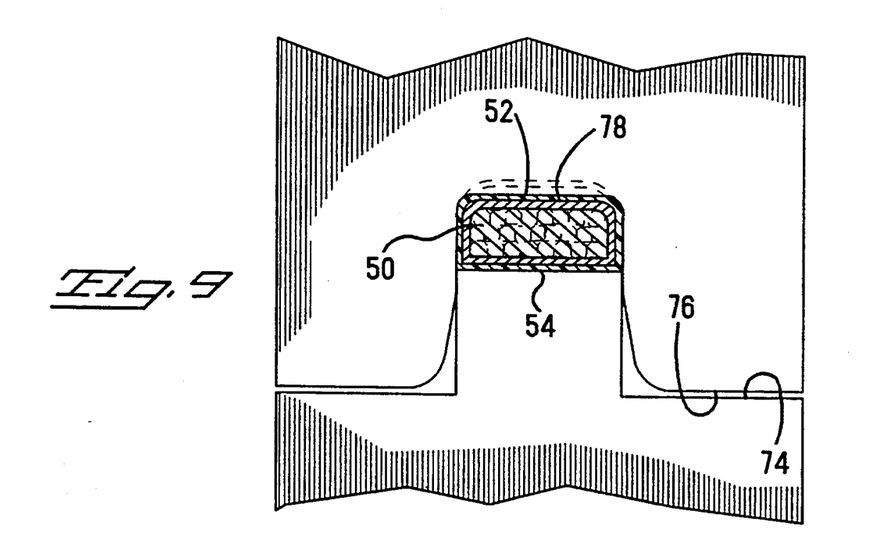
FIG. 9 is a cross-sectional view of an insulated terminal disposed during measurement between probe members of the crimp height measurement device according to the invention.

FIG. 8 is a cross-sectional view of the terminal 50 disposed between the probe members 6 and 8 prior to measurement of the crimp height. FIG. 9 illustrates the probe member 8 having been moved downwardly to the proximate position with respect to the probe member 6. In this position, the specially configured probe surfaces 54, 56 are engaged against the sleeve 52 adjacent to the crimped sides of the terminal 50. Due to the biasing force of the springs 22, the sleeve 52 is urged into contact with the wall 78, thereby enabling an accurate measurement of the crimp height to be taken. Since the probe surfaces 54, 56 have the same surface profile as the crimped sides of the terminal 50, an operator using the measurement apparatus can see and feel when the terminal 50 is properly disposed in the apparatus and is properly engaged between the probe members.

The invention also includes a means for measuring the crimp height of the terminal 50. As shown in FIGS. 1, 2 and 3, the means for measuring preferably includes a dial gauge 48 that is connected to the frame 10 by bracket 94 and has a contact point disposed for sensing movement of the plate member 16. The dial gauge 48 can be set up to provide a direct readout of crimp height for each engaged terminal, or a readout of differences in crimp height for a series of engaged terminals.

The dial gauge 48 is also useful as a combination memory means and measuring means. When a gage terminal having a standard, ideal crimp height and surface profile is engaged between the probe members, the dial gauge can be set to zero in order to record and memorize the standard crimp height. The dial indicator will give a direct readout of the difference between the standard crimp height and the actual crimp height of any other terminal that is engaged between the probe members. Alternatively, crimp height measurements could be recorded such as with pencil and paper and differences in crimp heights could be calculated by subtraction.

Alternative measuring means may include a linear variable differential transducer (LVDT) connected for indicating a displacement of the probe member 8.

Figure 13:
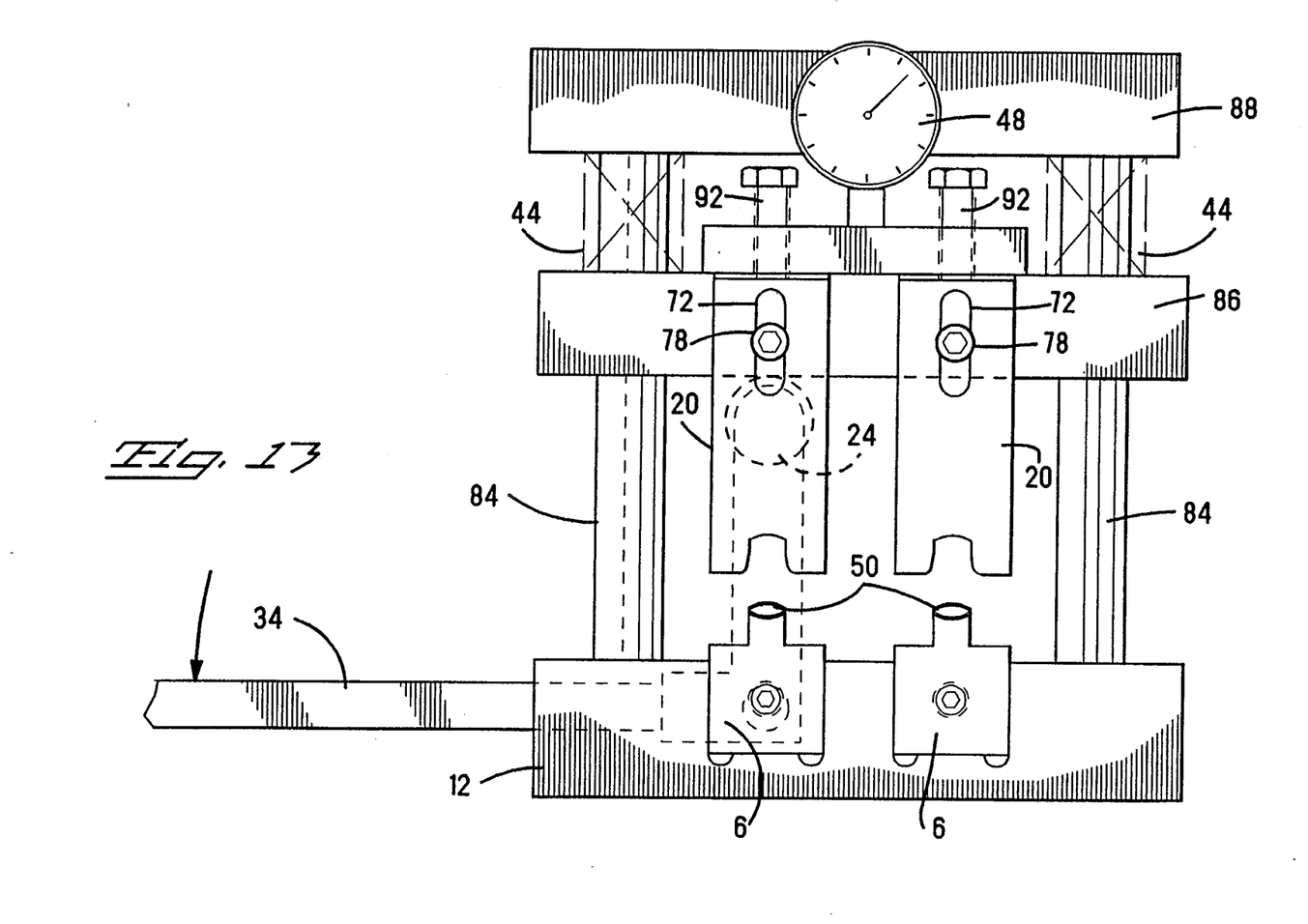
FIG. 13 is a front view of a crimp height measurement device having multiple pairs of opposed probe members in an open position.

An apparatus according the invention may also include multiple pairs of probe members. As shown in FIGS. 12 and 13, wherein like reference numbers are used to refer to like elements of the invention described hereinabove, the apparatus includes a plate member 86 that is guided for reciprocal movement by posts 84 extending through holes in the plate member 86. Springs 44 are connected between fixed top plate 88 and movable plate member 86 for biasing the plate member 86 and attached probe members 20 downwardly. Handle 34 is pivotable to urge roller 24 against a bottom of the plate member 86 in opposition to the springs 44. Probe members 6 are fixed to base 12. The probe members 20 are attached to the plate member 86 by threaded fasteners 78 which extend through slots 72 in the probe members 20, and the probe members 20 are guided in keyways of the plate member 86 for alignment of the probe members 20 with the probe members 6.

The probe members 20 are individually adjustable in position with respect to the plate member 86 in order to accommodate different sizes and shapes of terminals between each pair of the probe members 6, 20. In order to properly adjust a first pair of the probe members 6, 20 to measure crimp height of a particular terminal, fastener 78 associated with the first pair of probe members is loosened and an appropriate standard gage terminal is placed between the first pair of probe members. Associated adjustment screw 92 is turned in to take up free play above the probe member 20. The associated fastener 78 is then tightened to hold the probe member 20 in position, and dial gauge 48 is zeroed to memorize the crimp height of the standard gage terminal. A second pair of the probe members can be adjusted to measure crimp height of a different size or shape terminal. After removing the standard gage terminal from the first pair of probe members, an appropriate standard gage terminal is placed between the second pair of probe members. Associated adjustment screw 92 is adjusted to obtain a zero reading on the dial gauge 48, and associated fastener 78 is tightened to lock the probe member 20 in position. Subsequent pairs of the probe members can be adjusted to measure crimp heights of various different terminals in a similar manner.

The invention having been disclosed, a number of variations will now become apparent to those skilled in the art. Whereas the invention is intended to encompass the foregoing preferred embodiments as well as a reasonable range of equivalents, reference should be made to the appended claims rather that the foregoing discussion of examples, in order to assess the scope of the invention in which exclusive rights are claimed.

We claim:

1. An apparatus for measuring crimp height of a terminal which has been crimped to an element, the crimped terminal having a pair of crimped opposite sides each of which defines a surface profile, at least one of the opposite sides having a non-planar surface profile, the apparatus comprising:

a pair of opposed probe members which are relatively movable between a remote position wherein the probe members are spaced apart, and a proximate position wherein the probe members are engageable against the opposite sides of the terminal, the probe members being configured to match the surface profiles defined by the opposite sides of the terminal to be engaged;

means releasably locking the probe members at the remote position and for moving the probe members between the remote and proximate positions;

means for biasing the probe members against the opposite sides of the engaged terminal with a force which is greater than zero but is insufficient to deform the opposite sides; and, means for measuring a distance between the probe members when the probe members are engaged against the opposite sides.

2. The apparatus according to claim 1, further comprising a frame having a fixed base and a plate member guided for reciprocal movement with respect to the base, one of the probe members being coupled to the base and the other of the probe members being coupled to the plate member for reciprocal movement between the remote and proximate positions.

3. The apparatus according to claim 2, wherein the means for releasably locking and moving includes a manually operable handle connected for reciprocally moving the plate member.

4. The apparatus according to claim 2, wherein the biasing means includes a spring member connected between the base and the plate member.

5. The apparatus according to claim 4, wherein the means for releasably locking and moving includes a manually operable handle which is pivotally connected to the base, an end of the handle being disposed for urging the plate member in opposition to the spring member.

6. An apparatus for measuring crimp height of a terminal which has been crimped to an element, the crimped terminal having a pair of crimped opposite sides each of which defines a surface profile, at least one of the opposite sides having a non-planar surface profile, the apparatus comprising:

a pair of opposed probe members which are relatively movable between a remote position wherein the probe members are spaced apart, and a proximate position wherein the probe members are engageable against the opposite sides of the terminal, the probe members being configured to match the surface profiles defined by the opposite sides of the terminal to be engaged;

means for releasably locking the probe members at the remote position and moving the probe members between the remote and proximate positions;

means for biasing the probe members against the opposite sides of the engaged terminal with a force which is greater than zero but is insufficient to deform the opposite sides;

memory means for recording a standard separation between the probe members; and, means for measuring a difference between the standard separation and a final separation occurring when the probe members are engaged against the opposite sides.

7. The apparatus according to claim 6, further comprising a frame having a fixed base and a plate member guided for reciprocal movement with respect to the base, one of the probe members being coupled to the base and the other of the probe members being coupled to the plate member for reciprocal movement between the remote and proximate positions.

8. The apparatus according to claim 7, wherein the means for releasably locking and moving includes a manually operable handle connected for reciprocally moving the plate member.

9. The apparatus according to claim 7, wherein the biasing means includes a spring member connected between the base and the plate member.

10. The apparatus according to claim 9, wherein the means for releasably locking and moving includes a manually operable handle which is pivotally connected to the base, an end of the handle being disposed for urging the plate member in opposition to the spring member.

11. The apparatus according to claim 7, wherein the memory means and the means for measuring include a dial indicator fixed with respect to the base and having a tip in contact with the plate member for displaying a relative position of the plate member.

12. The apparatus according to claim 7, further comprising multiple pairs of the opposed probe members, and means for adjusting the standard separation between each of the multiple pairs.

13. The apparatus according to claim 12, wherein the means for adjusting includes each of the reciprocally movable probe members defining a slot and being attached to the plate member by a threaded fastener extending through the slot.

14. A process for measuring crimp height of a terminal which has been crimped to an element, the crimped terminal having a pair oil crimped opposite sides each of which defines a surface profile, at least one of the opposite sides having a non-planar surface profile, the process comprising the steps of:

providing a pair of probe menders which are configured to match the surface profiles defined by the opposite sides of the crimped terminal;

biasing the probe men, pets against the opposite sides of the crimped terminal with a force which is greater than zero but is insufficient to deform the opposite sides; and, measuring a separation between the probe members during the biasing separating and locking the probe members at a remote position against the biasing.

15. A process for measuring crimp height of a terminal which has been crimped to an element, the crimped terminal having a pair of crimped opposite sides each of which defines a surface profile, at least one of the opposite sides having a non-planar surface profile, the process comprising the steps of:

providing a pair of probe members which are configured to match the surface profiles defined by the opposite sides of the crimped terminal;

providing a gage terminal of a standard crimp height and having opposite sides defining surface profiles the same as the surface profiles of the crimped terminal;

biasing the probe members against the opposite sides of the gage terminal with a force which is greater than zero but is insufficient to deform the opposite sides thereof;

recording a standard separation between the probe members during the biasing;

separating and locking the probe members at a remote position against the biasing and withdrawing the gage terminal;

biasing the probe members against the opposite sides of the crimped terminal with a force which is greater than zero but is insufficient to deform the opposite sides thereof; and, measuring a difference between the standard separation and a final separation occurring during the biasing against the crimped terminal.

16. The process according to claim 15, wherein the measuring includes the steps of recording the final separation and calculating a difference between the standard separation and the final separation.

* * * * *

UNITED STATES PATENT AND TRADEMARK OFFICE
CERTIFICATE OF CORRECTION

PATENT NO. : 5,375,341
DATED : December 27, 1994
INVENTOR(S) : David A. College; David J. Erb It is certified that error appears in the above-indentified patent and that said Letters Patent is hereby corrected as shown below:

In the Claims:

Claim 1, Column 6, Line 62 - insert "for" between --means-- and --releasably--

Claim 1, Column 6, Line 63 - delete "for" between --and-- and --moving--

Claim 14, Column 8, Line 20 - "oil" should be --of--

Claim 14, Column 8, Line 24 - "menders" should be --members--

Claim 14, Column 8, Line 27 - "men, pets" should be --members--

Signed and Sealed this

Twenty-first Day of March, 1995

Attest:

BRUCE LEHMAN

*Attesting Officer*     *Commissioner of Patents and Trademarks*